(12) United States Patent
Lütkenhaus et al.

(10) Patent No.: US 6,177,741 B1
(45) Date of Patent: Jan. 23, 2001

(54) ELECTRIC-MOTOR WIRING SYSTEM

(75) Inventors: Norbert Lütkenhaus, Olfen; Stephan Schreckenberg, Dortmund, both of (DE)

(73) Assignee: Wilo GmbH, Dortmund (DE)

(*) Notice: Under 35 U.S.C. 154(b), the term of this patent shall be extended for 0 days.

(21) Appl. No.: 09/396,108

(22) Filed: Sep. 14, 1999

(30) Foreign Application Priority Data

Sep. 15, 1998 (DE) ................................ 198 42 170

(51) Int. Cl.⁷ .................................................. H02K 11/00
(52) U.S. Cl. ................................ 310/71; 310/89; 310/91
(58) Field of Search ........................ 310/71, 89, 91, 310/201

(56) References Cited

U.S. PATENT DOCUMENTS

| | | | |
|---|---|---|---|
| 3,979,615 | * | 9/1976 | Neff ........................ 310/71 |
| 4,616,149 | * | 10/1986 | Best ........................ 310/71 |
| 4,707,627 | * | 11/1987 | Best ........................ 310/71 |
| 5,196,752 | * | 3/1993 | Palma ..................... 310/260 |
| 5,783,881 | * | 7/1998 | Best et al. ............... 310/68 C |
| 5,828,147 | * | 10/1998 | Best et al. ............... 310/71 |

FOREIGN PATENT DOCUMENTS

| | | |
|---|---|---|
| 28 43 006 | 4/1980 | (DE) . |
| 36 04 675 | 8/1987 | (DE) . |
| 38 40 666 | 6/1990 | (DE) . |
| 298 00 928 U | 4/1998 | (DE) . |
| 0438027 | 7/1991 | (EP) . |
| 2580439A * | 10/1986 | (FR) . |
| 2032708A * | 5/1980 | (GB) . |

* cited by examiner

Primary Examiner—Nestor Ramirez
Assistant Examiner—Joseph Waks
(74) Attorney, Agent, or Firm—Herbert Dubno; Andrew Wilford

(57) ABSTRACT

An electrical motor has a housing, a rotor rotatable in the housing about an axis, a stator in the housing surrounding the rotor and having a plurality of windings each in turn having two axially directed and projecting ends, and a plate fixed to the windings and having an inner face turned axially toward the windings and an outer face turned axially away from the windings. The winding ends project axially past the plate and are exposed at the outer face thereof. Connector strips on the plate engage and interconnect at least some of the winding ends. Contacts on the outer plate face are connected to at least some of the winding ends.

17 Claims, 3 Drawing Sheets

ELECTRIC-MOTOR WIRING SYSTEM

FIELD OF THE INVENTION

The present invention relates to an electric motor or generator. More particularly this invention concerns a wiring system for connecting to the coils of an electric motor such as is used to drive a pump or blower.

BACKGROUND OF THE INVENTION

A standard electrical machine, normally a motor or generator, has a housing, a rotor rotatable in the housing about an axis, and a stator in the housing surrounding the rotor and having a plurality of windings each in turn having two ends between which an electric current is passed to create an electrical field. A contact support fixed to the stator on the side of the rotor opposite its axially projecting output shaft carries contacts adapted for connection to at least some of the winding ends. Such motors are used with the impeller of a pump or blower mounted directly on the output end of the shaft.

Normally such a motor is manufactured in an in-line process where the parts are fitted axially together. With such production it is necessary to resort to a separate manual step for connecting to the ends of the field windings. Furthermore when several windings are used, for instance in a three-phase system with six coils, one end of each winding is connected to one end of the diametrally opposite winding to produce three paired windings with six contacts, substantially complicating the paths the connections must follow. Three of these contacts are connected together as the center of a star connection, and the remaining three contacts are connected to the respective phases of the incoming feed circuit.

These interconnections are often made by soldering individual jumpers in place, a complex and expensive manual job that substantially increases the cost of the electric machine. Alternately it has been suggested to seat all the coil ends in a printed circuit board whose traces form the connections between the ends and between the ends and the input or output terminals. This latter system is difficult to realize because the high current cannot be readily transmitted through a standard printed-circuit trace. Boards capable of transmitting such high currents are very expensive.

OBJECTS OF THE INVENTION

It is therefore an object of the present invention to provide an improved electric machine of the mass-produced in-line type.

Another object is the provision of such an improved electric machine of the mass-produced in-line type which overcomes the above-given disadvantages, that is which is simple and easy to manufacture, even if set up for multiphase use.

SUMMARY OF THE INVENTION

An electrical motor has according to the invention a housing, a rotor rotatable in the housing about an axis, a stator in the housing surrounding the rotor and having a plurality of windings each in turn having two axially directed and projecting ends, and a plate fixed to the windings and having an inner face turned axially toward the windings and an outer face turned axially away from the windings. The winding ends project axially past the plate and are exposed at the outer face thereof. In accordance with the invention connector strips on the plate engage and interconnect at least some of the winding ends. Contacts on the outer plate face are connected to at least some of the winding ends.

According to the invention the plate is axially fitted to the stator and the connector strips are on at least one of the faces of the plate. These connector strips can therefore be relatively robust so that the electric machine, which can be a motor or generator, is quite sturdy and reliable. Furthermore the entire machine can be assembled by automatic equipment in the standard in-line, that is axial, production method whereby the parts are mainly pushed together axially. The connector strips can be mounted on the plate before it is fitted to the motor and the windings can even be mounted on this plate beforehand.

In accordance with the invention one of end of each winding ends is connected via a respective one of the connector strips to a respective end of another of the windings. Furthermore the plate is formed with respective notches through which the winding ends pass. The connector strips have tabs engaging the respective winding ends. These tabs can be crimped, clipped, and/or soldered to the respective winding ends.

The plate according to the invention is provided with clips securing the connector strips in place thereon. It is disk-shaped and has a central hole through which the rotor projects.

In a three-phase system there are according to the invention six such windings having twelve such winding ends and the plate is formed with twelve angularly equispaced openings through which the winding ends project. Once again, one end of each winding is connected via a respective one of the connector strips to one end of the winding diametrally opposite it. Of course a delta connection system is also possible with the construction according to this invention.

The connector strips in accordance with the invention are on the outer face of the plate and cross at three points where they are axially spaced from one another. Each of the strips only crosses one other of the strips and the strips are of identical shape. Thus the entire subassembly formed by the plate, windings, and connector strips can be axially symmetrical, making assembly simple and relatively foolproof. Another connector strip on an inner face of the plate is connected to the other ends of the windings. Running the connector strips on each face of the plates in several planes allow metallic strips capable of carrying considerable current to be used.

The contacts according to the invention are formed by a plurality of sockets on the other plate face connected to respective ones of the strips. In addition each of the windings includes a dielectric holder frame.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
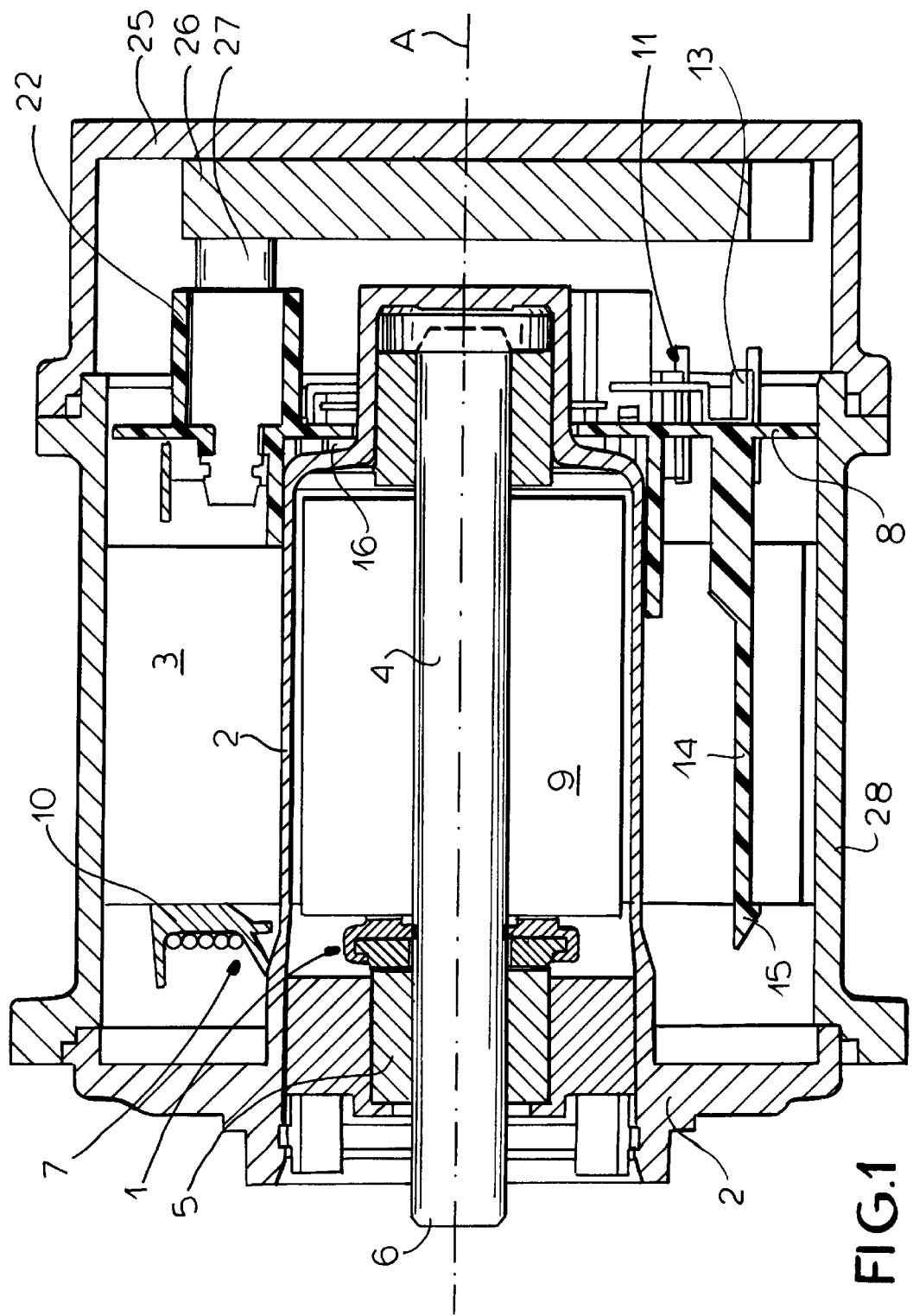
FIG. 1 is an axial section through a motor according to the invention.

As seen in FIG. 1 a polyphase induction motor used to drive a centrifugal pump or blower is of the split tube type with a rotor 1 having a shaft 4 carrying a winding 9 separated by a split-tube casing 2 from a stator 3. The shaft 4 is journaled in bearings 5 inside the split casing 2 and has an output end 6 rotatable about an axis A and projecting from a housing 28 for attachment to the unillustrated load.

Figure 2:
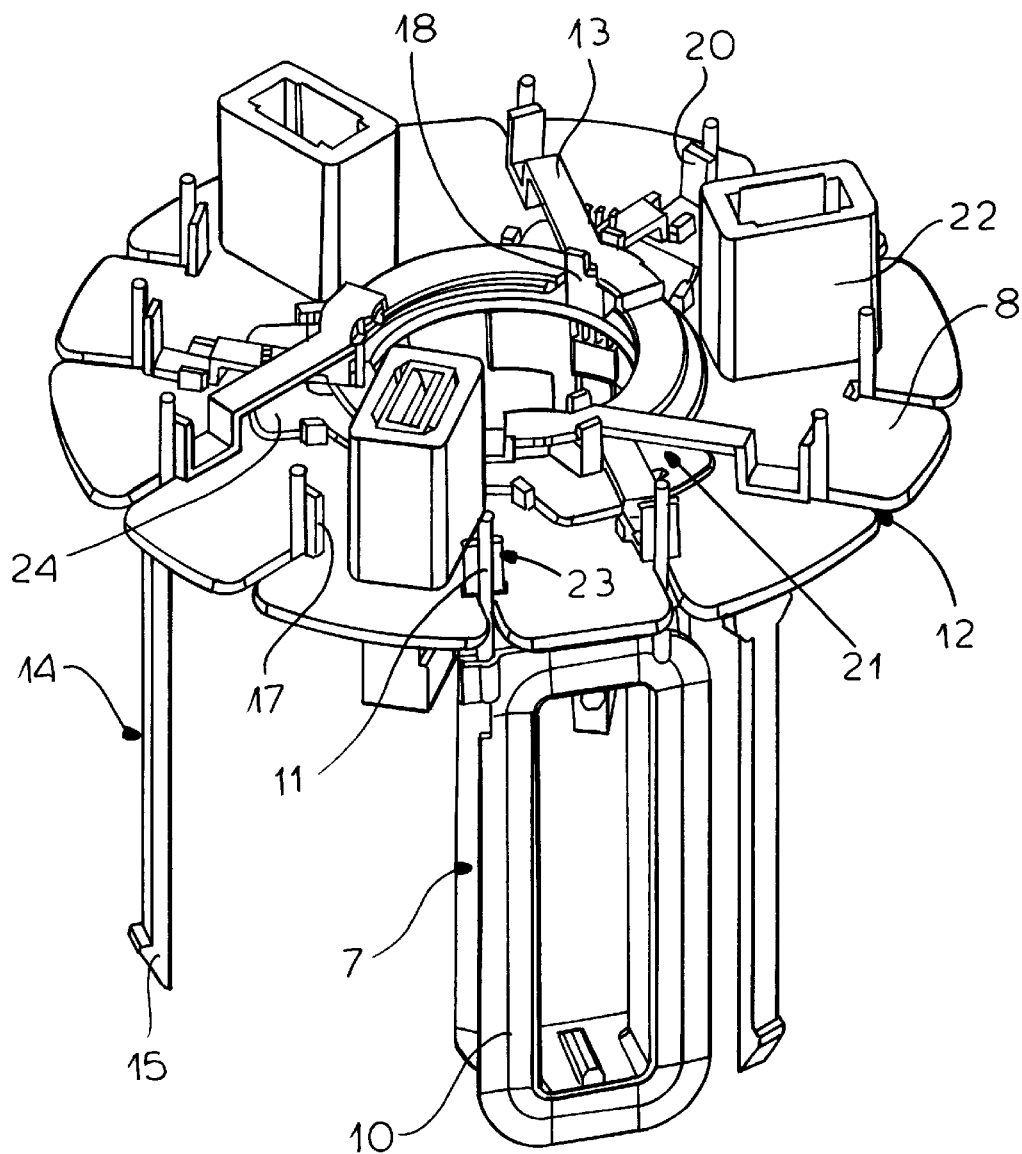
FIG. 2 is a perspective view of elements of the motor.
Figure 3:
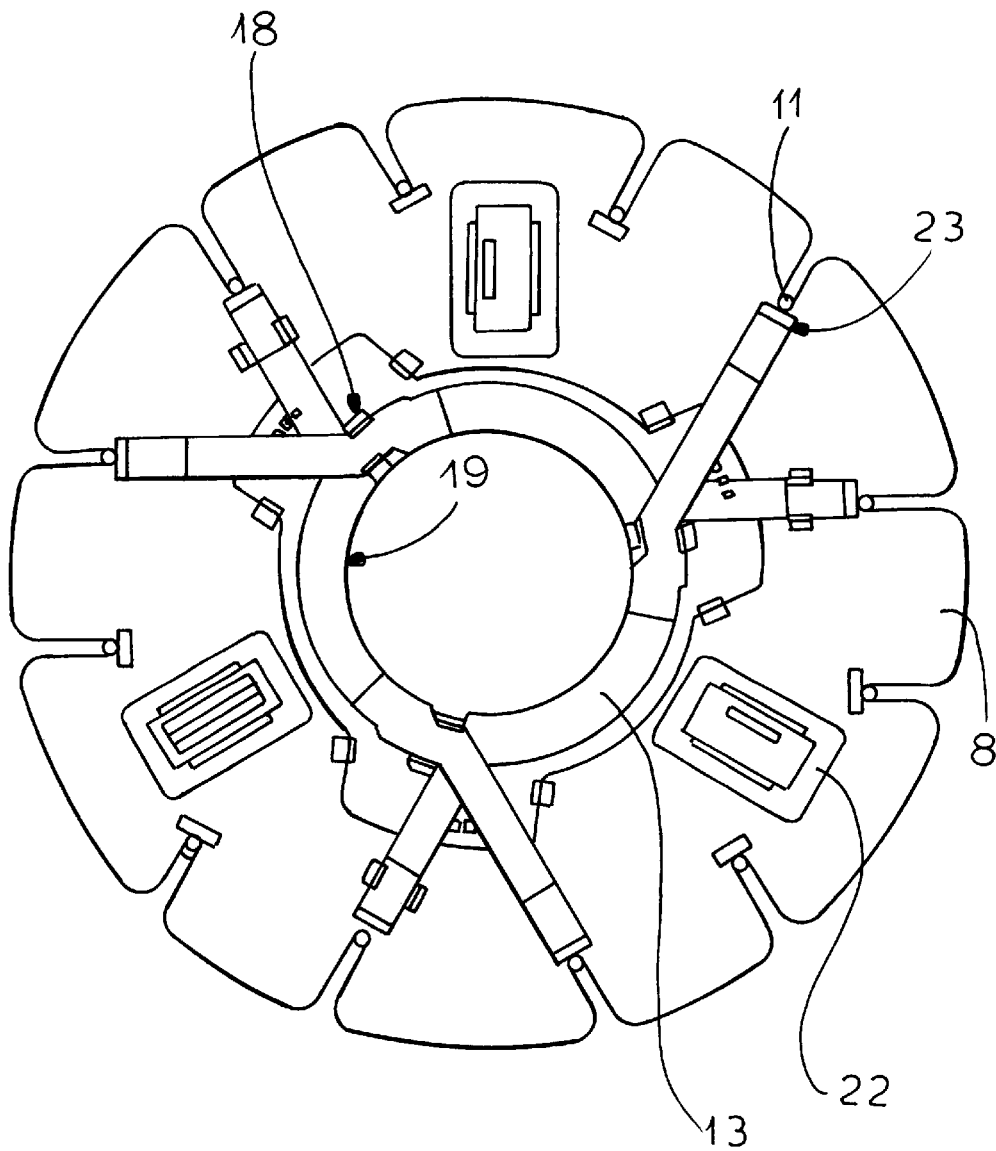
FIG. 3 is an end view of the structure of FIG. 2.

The stator 3 has six windings 7 (one shown in FIG. 2) held on respective dielectric support frames 10 and oriented to produce a radially directed magnetic field. A support plate or disk 8 carries the holder frames 10 and is formed with twelve 30°-offset slots 12 in which fit ends 11 of the stiff wire forming the windings 7. Arms 14 extending unitarily from the plate 8 parallel to the axis A, which is perpendicular to the plate 8, have barb ends 15 that hook on the housing 28 to hold the stator 3 in place. The casing 2 projects through a central hole 19 of the plate 8.

One end of each winding 7 is connected in a star hookup to an end tab 20 of one of three shaped copper connector strips 13 on the plate 8 and through this strip 13 to one end of the winding 7 diametrically across from it. The connector strips 13 are secured by clips 18 to the outer face of the plate 8 and are bent to pass each other at 21 with axial spacing. Three of the remaining six ends 11 are connected together via tabs 17 of a circuit board or connector strip 16 on the inner face of the plate 8 and the other three ends 11 bear on connector tabs 23 of connector strips running on the inside face of the board 18 and connected in turn to three sockets 22. The tabs 17, 20, and 23 are soldered to and/or crimped on the respective winding terminals ends 11.

A control-circuit board 26 mounted in an end cap 25 of the housing 28 has connector pins or plugs 27 that fit into the sockets 22 to power and control the motor. Another unillustrated connection is made to the board 18 forming the center of the star connection. A holder 24 is provided for a hall-effect sensor that monitors the magnetic field of the motor.

This machine, which could also be a generator, is therefore assembled mainly by pushing its parts together axially. The stator 3 can be fitted in the housing 28 and then the plate 8 installed with the connections made, or the coils 7 can be mounted on the plate 8 and then this entire subassembly can be pushed into the housing 28.

We claim:

1. An electrical motor comprising:

a housing;

a rotor rotatable in the housing about an axis;

a stator in the housing surrounding the rotor and having a plurality of windings each in turn having a pair of axially directed and projecting ends;

a plate fixed to the windings, formed at each of the windings with a pair of axially throughgoing openings, and having an inner face turned axially toward the windings and an outer face turned axially away from the windings, the winding ends each projecting axially through a respective one of the openings past the plate and being exposed at the outer face thereof;

connector strips on the plate engaging and interconnecting at least some of the winding ends; and contacts on the outer plate face connected to at least some of the winding ends.

2. The electrical motor defined in claim 1 wherein the plate is axially fitted to the stator.

3. The electrical motor defined in claim 1 wherein the connector strips are on at least one of the faces of the plate.

4. The electrical motor defined in claim 1 wherein one of each pair of winding ends is connected via a respective one of the connector strips to one of the ends of another of the windings.

5. The electrical motor defined in claim 1 wherein the plate is formed with respective notches through which the winding ends pass and constituting the openings.

6. The electrical motor defined in claim 5 wherein the connector strips have tabs engaging the respective winding ends.

7. The electrical motor defined in claim 1 wherein the plate is provided with clips securing the connector strips in place thereon.

8. The electrical motor defined in claim 1 wherein the plate is disk-shaped and has a central hole through which the rotor projects.

9. The electrical motor defined in claim 1 wherein there are six windings having twelve winding ends and the openings through which the winding ends project are angularly equispaced.

10. The electrical motor defined in claim 9 wherein one end of each winding is connected via a respective one of the connector strips to one end of the winding diametrally opposite it.

11. The electrical motor defined in claim 10 wherein the connector strips are on the outer face of the plate and cross at three points where they are axially spaced from one another.

12. The electrical motor defined in claim 11 wherein each of the strips only crosses one other of the strips.

13. The electrical motor defined in claim 10 wherein the strips are of identical shape.

14. The electrical motor defined in claim 10 further comprising another connector strip on an inner face of the plate connected to the other ends of the windings.

15. The electrical motor defined in claim 1 wherein the contacts are a plurality of sockets on the outer plate face connected to respective ones of the strips.

16. The electrical motor defined in claim 1 wherein each of the windings includes a dielectric holder frame.

17. The electrical motor defined in claim 1 wherein the connector strips are metallic.

* * * * *